United States Patent
Gutbrod et al.

(10) Patent No.: US 7,156,168 B2
(45) Date of Patent: Jan. 2, 2007

(54) METHOD FOR CONTROLLING AN AIR CONDITIONING UNIT FOR AN AUTOMOBILE

(75) Inventors: Thomas Gutbrod, Bad Neustadt (DE); Thomas Noeth, Bad Neustadt (DE)

(73) Assignee: PREH GmbH, Bad Neustadt/Saale (DE)

( * ) Notice: Subject to any disclaimer, the term of this patent is extended or adjusted under 35 U.S.C. 154(b) by 0 days.

(21) Appl. No.: 10/841,554

(22) Filed: May 10, 2004

(65) Prior Publication Data

US 2004/0226708 A1   Nov. 18, 2004

Related U.S. Application Data

(63) Continuation of application No. PCT/EP02/11598, filed on Oct. 17, 2002.

(30) Foreign Application Priority Data

Nov. 10, 2001   (DE) ................. 101 55 410

(51) Int. Cl.
*B60H 1/00*   (2006.01)
(52) U.S. Cl. .............. 165/271; 165/202; 700/302; 700/303
(58) Field of Classification Search ........ 165/202, 165/203, 204, 254, 271, 288, 290; 236/51; 700/300, 302, 303
See application file for complete search history.

(56) References Cited

U.S. PATENT DOCUMENTS 5,553,661 A   9/1996   Beyerlein et al.
6,782,945 B1*   8/2004   Eisenhour .................... 165/203
6,859,687 B1*   2/2005   Obradovich et al. ........ 165/202

FOREIGN PATENT DOCUMENTS

| DE | 40 24 431 A1 | 2/1991 |
| DE | 40 41 770 C1 | 7/1992 |
| DE | 197 48 826 C1 | 2/1999 |
| DE | 197 44 414 A1 | 4/1999 |
| DE | 198 02 594 A1 | 7/1999 |
| DE | 198 29 143 C1 | 7/1999 |
| DE | 199 02 201 A1 | 8/2000 |
| DE | 199 53 511 A1 | 5/2001 |

OTHER PUBLICATIONS

Patent Abstracts of Japan, vol. 8, No. 216 (M-329), Oct. 3, 1984 & JP 59 100010 A (Matsushita Denki Sangyo KK), Jun. 9, 1984.

* cited by examiner

*Primary Examiner*—Ljiljana Ciric
(74) *Attorney, Agent, or Firm*—McGrath, Geissler, Olds & Richardson, PLLC

(57) ABSTRACT

An intensity of solar radiation is determined in a vehicle based on an absolute position of the sun, a spatial orientation of the vehicle, and a measured intensity of the sun. A position of the sun relative to the vehicle is determined on the basis of the orientation of the vehicle on the globe. This orientation can be determined by GPS data, at least one acceleration sensor, and/or an additional vehicle compass. The position of the sun relative to the vehicle can be determined based on the individual or combined data and the actual, absolute position of the sun, thereby making it possible to determine the intensity of the solar radiation in the passenger compartment of the vehicle.

16 Claims, 3 Drawing Sheets

METHOD FOR CONTROLLING AN AIR CONDITIONING UNIT FOR AN AUTOMOBILE

This nonprovisional application is a continuation of International Application PCT/EP/02/11598, which was filed in German on Oct. 17, 2002, and which claims priority to German Patent Application No. 101 55 410.9, which was filed in Germany on Nov. 10, 2001, both of which are herein incorporated by reference.

BACKGROUND OF THE INVENTION

1. Field of the Invention

The present invention relates to individual control and regulation of a vehicle climate control system based on an intensity and a direction of incident solar radiation.

2. Description of the Background Art

It is common practice to regulate and/or control an air conditioning unit by indirectly determining solar radiation through the outside temperature and the temperature inside the vehicle. DE 198 29 143 C1 is based on such a method.

DE 197 44 414 A1 describes an automotive air conditioning system with a plurality of operating modes, which are automatically set according to a predeterminable target region of operation, that is, the region where the vehicle is currently located. Such target regions of operation are, among others, Germany, the USA etc., whereby the different comfort levels of the respective population is also taken into consideration. To automatically set a mode of operation, a control unit is connected with a navigation system, which has a sensor to receive the GPS data.

DE 198 02 594 A1 also describes a method for controlling devices for automatic driving functions, like setting a climate profile for an air conditioning system. With the aid of data, which provide information about the current location, country-specific programs are initialized. Apart from GPS data, RDS data (Radio Data System), which includes country-specific information, is also downloaded.

A method for controlling/regulating of heat flows in the vehicle is disclosed in DE 199 53 511 A1. It is known therefrom to detect the current ambiance through GPS data or to record it through signals, which are recorded by a built-in cartographic ambiance model. However, the control/regulation itself is driven by the current load state of the vehicle's motor and the current vehicle operation and ambient conditions.

Furthermore, in DE 199 02 201 A1, a method and corresponding device for regulating the interior temperature of a vehicle are disclosed. Here, depending on an individually desired interior temperature and a recorded exterior temperature at a destination point, the interior temperature is slowly adjusted to the climate that is prevailing at the destination point to guard against an unwelcome temperature shock.

From DE 40 24 431 C2, a conventional method for controlling an automotive air conditioning system is known, whereby an even conditioning of the air based on the quantity of solar radiation is achieved by controlling the amount of air released from a right and left air distribution vent. This control takes the preferences of a passenger into consideration. The interior temperature is automatically regulated with the aid of a sun direction analyzer that determines the direction of the incident sun radiation by two solar radiation sensors, and a sun intensity analyzer for computing the intensity of the sun radiation. The solar radiation sensors measure the incident sun radiation to the right and left of the vehicle.

However, optimum comfort regulation in the vehicle can only be achieved when not only the actual sun intensity, but also the position of the sun in relation to the vehicle is known.

A sun position detector for determining the angle of incidence as well as the direction of the incident sun beams is described in DE 197 48 826 C1. This sensor includes a shadow mask, which has a slot that allows sun light to pass through. Depending on the angle of incidence of the solar radiation passing through the slot, different positions of a sensor array located below are radiated allowing a definite evaluation regarding the angle of incidence and the incident direction of the solar radiation. The object here is to actuate vehicle lights with these signals. Not measured is the intensity of the incident sun radiation.

From DE 40 41 770 C1, the structure of a sun sensor is known.

SUMMARY OF THE INVENTION

It is therefore an object of the present invention to provide a method that allows individual regulation of an interior temperature under consideration of an intensity and a direction of incident sun radiation.

The invention is based on the idea to determine the intensity and direction of incident sun radiation in a vehicle from an absolute sun position and a present spatial orientation of the vehicle as well as a measured sun intensity.

The absolute sun position is thereby determined depending upon the global position as well as the time of day and the season. The relative position of the sun to the vehicle is determined on the basis of the orientation of the vehicle on the globe, which can be determined through GPS data, acceleration sensors, and/or an additional automotive compass. With this data, individually or combined, and the actual, absolute position of the sun, that is, the actual position of the sun in the sky, the position of the sun relative to the vehicle can be determined. Therefrom, while taking the intensity of the sun into account, the intensity of the incident sun radiation directly into the interior of the vehicle can be determined.

Knowing the exact position of the sun allows a precise measurement of the intensity of the sun that the passengers in the vehicle are exposed to. Additionally, by knowing the time of day and the season as well as the climate zone, where the vehicle is located, a plausibility test of the intensity measurement is possible to avoid incorrect settings, for example, when a substantial shifting of red in the solar spectrum occurs. This allows the employment of simple sensors, for example, silicon photo diodes or photo transistors.

In a further embodiment of the invention, the inclination of the vehicle with respect to a vertical and horizontal axis of the vehicle can be determined with high accuracy with the aid of inclination sensors, and can be taken into account when the intensity of the solar radiation in the interior of the vehicle is determined.

The method allows individual comfortable temperature regulation for the passenger who is exposed to the direct solar radiation without causing discomfort to other passengers who are seated, for example, in the shade of the vehicle's roof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein.

DETAILED DESCRIPTION

Figure 1:
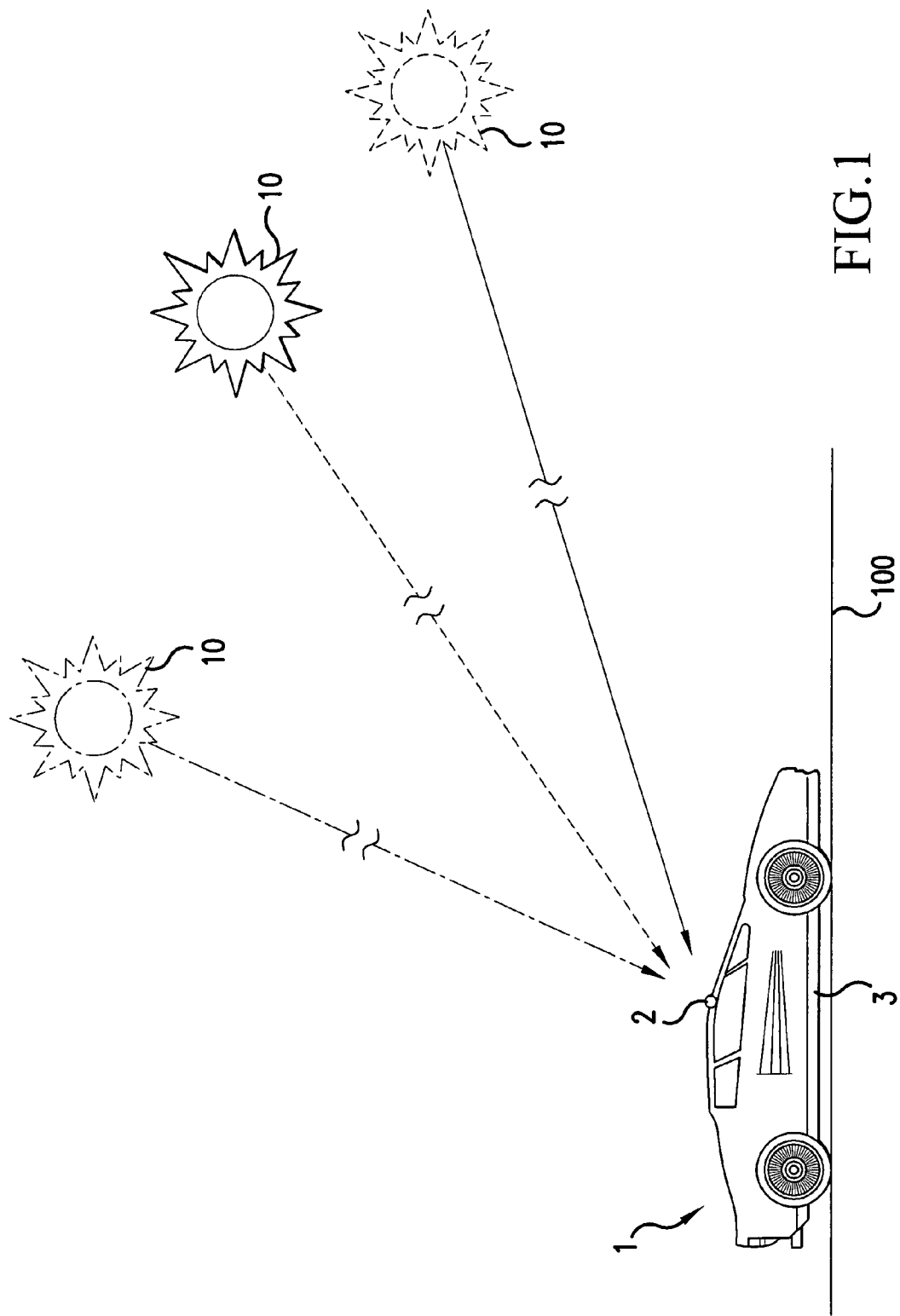
FIG. 1 is an illustration of a vehicle with a sun sensor, according to a preferred embodiment of the present invention.
Figure 2:
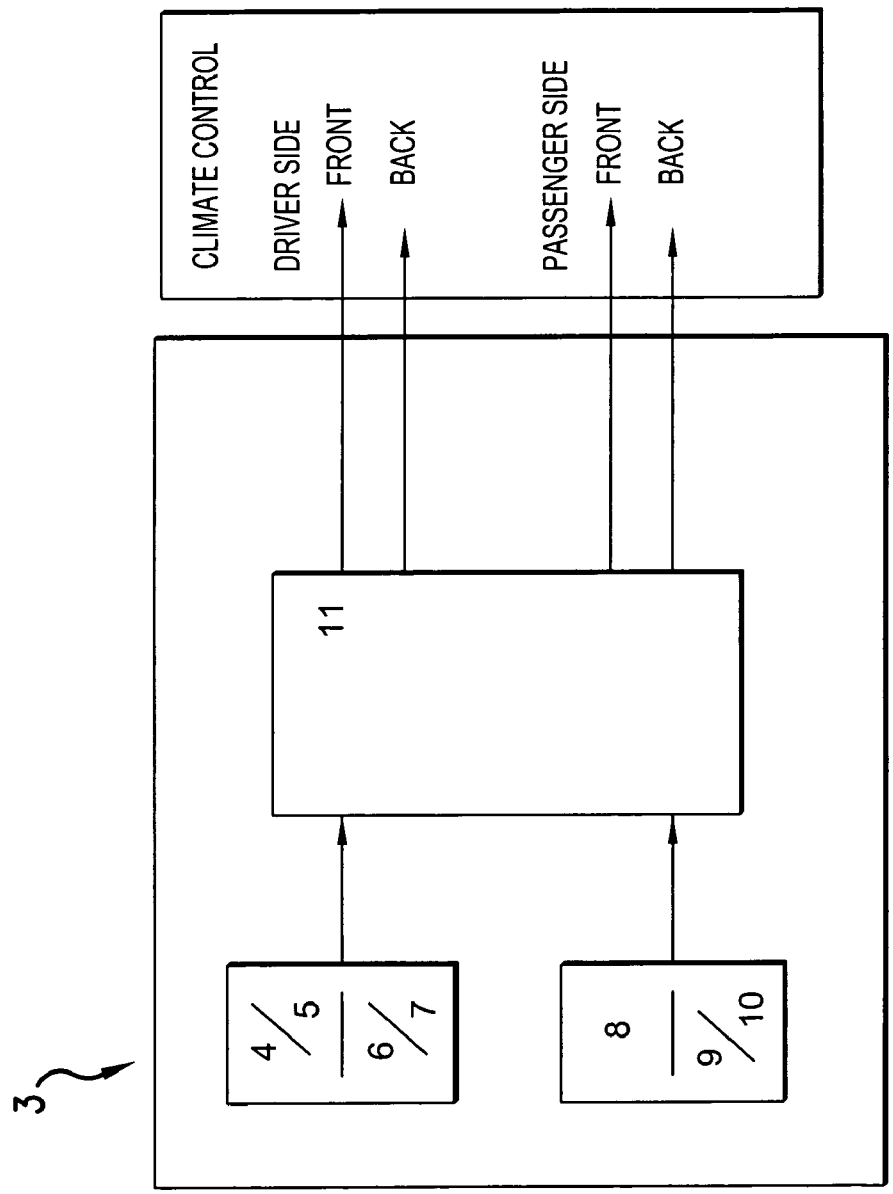
FIG. 2 is a block diagram of a preferred embodiment of the present invention.

In FIG. 1, a vehicle 1 is illustrated, which is equipped with a sun sensor 2 as well as additional electronic building units 3. With reference numeral 20, a sun in various positions to the vehicle 1 is illustrated. The vehicle 1 can be equipped with a navigation system 4 and/or a GPS receiver 5, a RDS (radio data system) radio 6 with a vehicle bus, such as an interconnected CAN-Bus (controllable area network), or a date/time indicator 7, and/or a compass 8, or at least one accelerator sensor 9 and at least one inclination sensor 10, which are interconnected with a microprocessor 11 (FIG. 2). The previously mentioned electronic building units 3 are integrated on, or rather, in the vehicle 1 in a conventional fashion.

A first accelerator sensor 9 has the function of determining the transverse acceleration of the vehicle, a second accelerator sensor (not shown in detail) provides a signal for the longitudinal acceleration, which can be determined by the change in the vehicle's speed. It is, by comparison, the function of the first inclination sensor 10 to determine the longitudinal tilt of the vehicle, whereas a second inclination sensor (not illustrated) preferably measures the lateral tilting of the vehicle.

However, it is also possible to collect the necessary measuring data through a combination of only one acceleration sensor 9 and one inclination sensor 10. The acceleration values, however, provide information only about the change in direction, but not about the orientation of the vehicle, so that exact information is preferably obtained through an adjustment using GPS data from the GPS receiver 5.

Figure 3:
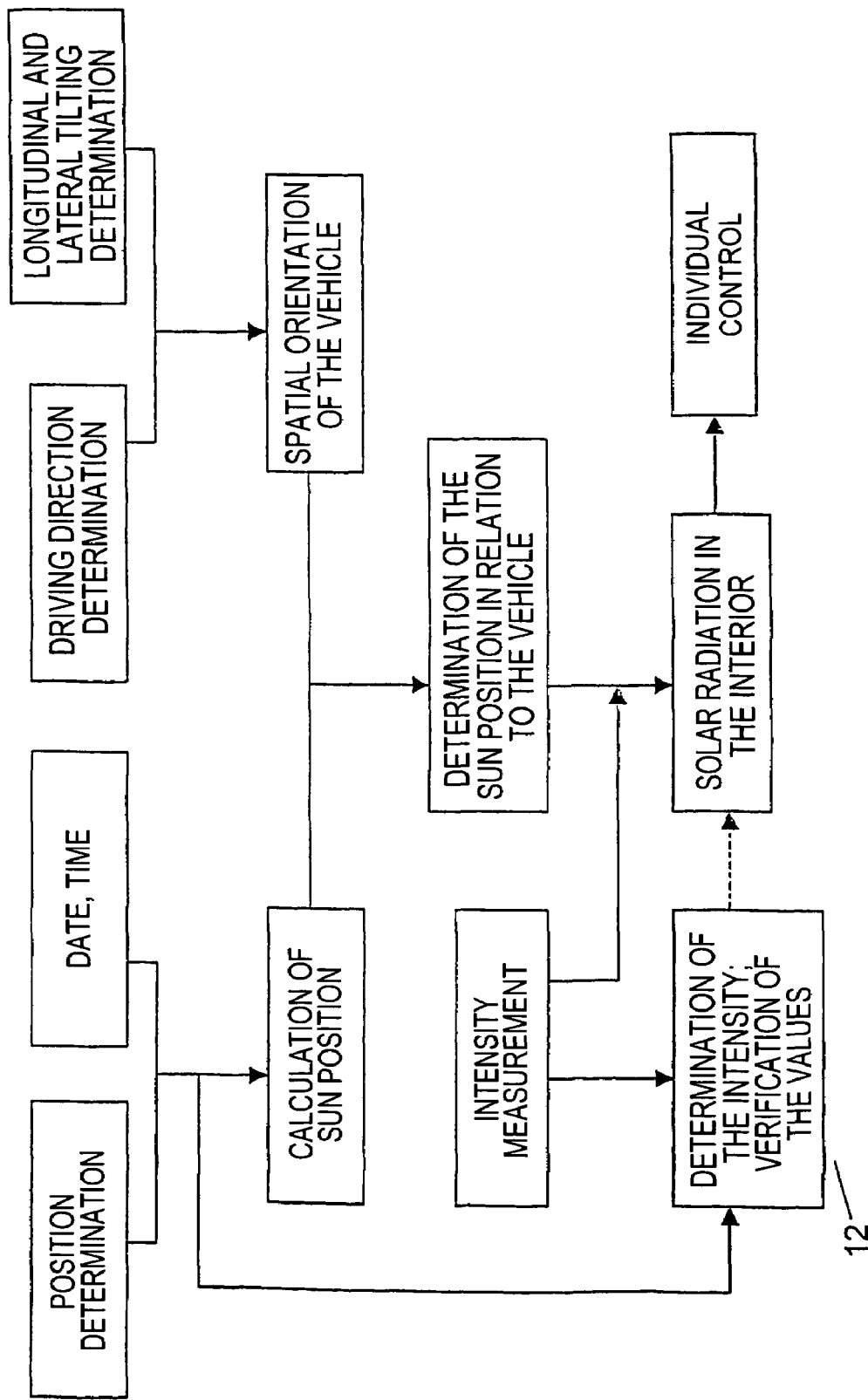
FIG. 3 is an operational sequence shown in a block diagram of a preferred embodiment of the present invention.

The method is illustrated in FIG. 3 with a block diagram. Referring to FIG. 3, it can be seen that the present invention utilizes a location of the vehicle, a time and date input, and a spatial orientation in order to determine individual control of a climate control apparatus. The location of the vehicle is preferably determined via the navigation system 4 and/or the GPS receiver 5. The time and date input is preferably determined via the RDS-radio, which provides a date and time via a received radio signal, or via a date and time clock provided in the vehicle. The spatial orientation of the vehicle is determined preferably by the compass 8 and the inclination sensor 10. Each of the apparatus can be interconnected with one another via a vehicle bus system, such as the CAN-Bus system, in order to interchange data including data from sensors, diagnostic systems, control values, etc. The above described data, e.g., the location of the vehicle, the time and date, and the spatial orientation, is input into the microprocessor 11 and utilized for controlling the climate control apparatus, e.g., a vehicle heating and air-conditioning system. The method of controlling the climate of the vehicle according to a preferred embodiment of the present invention is described herein below.

In a first step, using the GPS data, that is, the data defining a target region, a determination of the actual position of the vehicle is made. The data can be provided by the navigation system 4 or the GPS receiver 5. Parallel thereto, the additional data, like date and time, can be obtained, for example, from the RDS 6. From the combined information, a first value concerning the current absolute position of the sun is determined.

Apart from the determination of the absolute position of the sun, the determination of the driving direction as well as the longitudinal and lateral tilting of the vehicle 1 is made to detect the spatial orientation of the vehicle 1 in relation to the surface of the earth 100.

The information about the driving direction, that is, the change of the vehicle's position en route and possibly an incline in the road can be determined with the GPS data mentioned previously. Information about small-scale movements like, for example, the orientation of the vehicle when parking, can be provided by a steering angle sensor (not illustrated) of the vehicle 1.

In addition, the orientation of the vehicle 1 can be detected from the data of the automotive compass 8.

Furthermore, the longitudinal tilting caused, for example, by an incline in the road, can be determined from GPS data, whereby analogous information is stored in the micro processor 11, or else directly from the change of the vertical position.

From these two pieces of information, e.g., the actual driving direction and the actual tilting, the spatial orientation of the vehicle 1 can be determined.

Through the absolute position of the sun and the spatial orientation, the relative position of the sun to the vehicle 1 can now be determined in an intermediate step.

Additionally, the intensity of the incident sun radiation on the vehicle 1 is measured, preferably with a simple sun sensor 2, and, together with the detected relative sun position, the solar radiation in the interior of the vehicle 1 is then determined. Based on these values, the interior temperature is individually regulated, whereby the passenger, that is, the passengers who are exposed to direct sun radiation are, for example, provided with more cold air than the others.

Using a simple sun sensor 8 allows the insertion of a step 12, wherein the measured radiation intensity is compared with the known data from the GPS 5 and the RDS 6 for verification purposes. Typically, silicon sensors are sensitive in a range of 380 nm to ca. 1150 nm, with the use of a daylight filter in a range of 730 nm to ca. 1120 nm. Therefore, only part of the incident solar strength is measured with these sensors 2. The total solar strength (intensity) is determined through spectral distribution of the sun light. In particular, when the sun 10 rises or sets, the solar spectrum changes considerably, which suggests a high total intensity. Due to the absence of ultra-violet and visible parts, the actual sun intensity is, however, much lower. Using the position of the sun and the maximum potential sun intensity depending on the time of the day and the present location, measuring errors of the sensor 2 can be detected and compensated for.

Furthermore, this step 12 allows a function test of the sensor 2. The result of this comparison can then interfere in the operational sequence. For example, if the result of the comparison is positive, that is, if the measured intensity is in the range of a likely intensity, the individual regulation is activated. On the other hand, if the result is negative, a new calculation, particularly a new intensity measurement, takes place. If the result is again negative, it can be concluded, for example, that the sun sensor 2 is defective. It should then be replaced. For continued functional efficiency of the temperature regulation, the data stored for compensation can then be used, for example. The definition of "vehicle", apart from passenger and service vehicles, also includes railed vehicles and watercraft.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling an air conditioning system in a vehicle, the method comprising the steps:
    determining a position of the vehicle;
    determining an absolute sun position on the basis of the position of the vehicle;
    determining a spatial orientation of the vehicle;
    computing a position of the sun in relation to the vehicle based on the determined absolute sun position and the determined spatial orientation of the vehicle;
    measuring a sun intensity;
    determining direct solar radiation incidence into the interior of the vehicle based on the computed position of the sun and the measured sun intensity; and
    adjusting the air conditioning system on the basis of the determined direct solar radiation,
    wherein the spatial orientation is determined at least by determining a longitudinal and lateral tilting of the vehicle.

2. The method according to claim 1, further comprising the step of determining a direction of the incident sun radiation into the interior of the vehicle.

3. The method according to claim 1, wherein the position of the vehicle is determined from GPS data and/or RDS data.

4. The method according to one of claim 1, wherein the absolute sun position is determined by considering date and time.

5. The method according to one of claim 1, wherein the spatial orientation of the vehicle is determined from at least one of GPS data of a GPS receiver, data from at least one acceleration sensor, or an automotive compass.

6. The method according to claim 1, wherein the longitudinal and lateral tilting of the vehicle is measured by at least one inclination sensor.

7. The method according to claim 6, wherein small-scale motion changes of the longitudinal and lateral tilting of the vehicle are detected through signals from a steering angle sensor.

8. The method according to claim 1, wherein the intensity of the incident sun radiation is measured by a sun sensor.

9. The method according to one of claim 1, wherein the measured sun intensity is compared to GPS data and/or RDS data.

10. The method according to claim 9, wherein the air conditioning system is controlled so that individual steps of the comparison are repeated when a result of a function test is negative.

11. A method for controlling an air conditioning system in a vehicle, the method comprising the steps:
    determining a position of the vehicle;
    determining an absolute sun position on the basis of the position of the vehicle;
    determining a spatial orientation of the vehicle;
    computing a position of the sun in relation to the vehicle based on the determined absolute sun position and the determined spatial orientation of the vehicle;
    measuring a sun intensity;
    determining direct solar radiation incidence into the interior of the vehicle based on the computed position of the sun and the measured sun intensity; and
    adjusting the air conditioning system on the basis of the determined direct solar radiation,
    wherein the measured sun intensity is compared to GPS data and/or RDS data, and
    wherein, as a result of the comparison, measuring errors of the sun sensor are compensated.

12. A climate control apparatus comprising:
    a sun position determination unit for determining an absolute value of a position of the sun based on a global position of a vehicle;
    a spatial orientation unit for determining a spatial orientation of the vehicle, the spatial orientation being determined at least by determining a longitudinal and lateral tilting of the vehicle;
    a relative sun position unit for determining a relative position of the sun based on the absolute value of the position of the sun and the spatial orientation of the vehicle;
    a solar intensity measurement unit for measuring incident solar radiation; and
    a climate control regulation unit for regulating a climate of the vehicle on the basis of the relative sun position and the measured incident solar radiation.

13. The climate control apparatus according to claim 12, wherein the absolute value of the position of the sun is determined on the further basis of local date and/or time.

14. The climate control apparatus according to claim 12, wherein the spatial orientation of the vehicle is determined on the basis of a driving direction and/or a longitudinal and lateral tilting of the vehicle.

15. The climate control apparatus according to claim 14, wherein the driving direction is determined by a compass.

16. The climate control apparatus according to claim 12, wherein the climate of the vehicle is individually regulated such that a temperature of individual areas within the vehicle are adjusted.

* * * * *